Dec. 19, 1967     T. SCHAAP     3,358,702

COMBINATION DISPOSAL AND WASHER

Filed May 21, 1965     8 Sheets-Sheet 1

INVENTOR.
THEODORE SCHAAP
BY Price & Heneveld
ATTORNEYS

Dec. 19, 1967   T. SCHAAP   3,358,702
COMBINATION DISPOSAL AND WASHER
Filed May 21, 1965   8 Sheets-Sheet 2

INVENTOR.
THEODORE SCHAAP
BY
ATTORNEYS

Fig. 4

INVENTOR.
THEODORE SCHAAP

INVENTOR.
THEODORE SCHAAP
BY
ATTORNEYS

Fig. 11

Dec. 19, 1967  T. SCHAAP  3,358,702
COMBINATION DISPOSAL AND WASHER
Filed May 21, 1965  8 Sheets-Sheet 8

INVENTOR.
THEODORE SCHAAP
BY
ATTORNEYS

United States Patent Office 3,358,702
Patented Dec. 19, 1967

3,358,702
COMBINATION DISPOSAL AND WASHER
Theodore Schaap, 2521 Brookside SE.,
Grand Rapids, Mich. 49507
Filed May 21, 1965, Ser. No. 457,708
10 Claims. (Cl. 134—58)

This invention relates to a kitchen appliance apparatus, and more particularly to a compact, multiple-appliance assembly uniquely related to a double sink unit.

The modern kitchen, containing a multiple of various appliances such as a dishwasher, a clothes washer, a garbage disposal, and so forth, is often overcrowded. This is particularly true in apartments and mobile homes. A dishwasher consumes a great deal of space, requires special plumbing and electrical connections, and furthermore is expensive. A clothes washer, likewise, consumes a substantial amount of space, requires special plumbing and electrical connections, and is expensive also. Each such piece of equipment has a complete set of multiple plumbing connections, drain connections, electrical controls, motors, valves, solenoids, and other moving parts requiring maintenance.

Further, a dishwasher should be near the sink to be most convenient, so that food scraps can be scraped into the garbage disposal just prior to placing of individual dishes in the dishwasher. This is not always possible or practical, however, with present equipment.

It is an important object of this invention to provide an integrated kitchen appliance apparatus that uniquely effects a dishwasher as a coordinated portion of a double sink and disposal unit. The dishwasher utilizes the sink plumbing as component parts, and employs power from the disposal unit to operate it. Yet it can be operated simultaneously with the disposal of garbage.

It is another object of this invention to provide an integrated kitchen appliance that effectively combines a double sink, a garbage disposal, a dishwasher, and a clothes washer, all using only the space under the sink, and requiring no extra floor space. All use the same plumbing, and an integrated control system. Space saving is very substantial, therefore. Plumbing is reduced to one drain, one trap, one hot water line and one cold water line. Maintenance is relatively minor, both because of simplicity of structure and easy accessibility.

Another object of this invention is to provide a compact, multiple-appliance assembly, uniquely coordinated with a double sink, to enable one sink to serve as a dishwasher chamber or a clothes washer chamber, as well as a conventional sink. The other sink also serves as a garbage disposal, as well as a conventional sink. Moreover, the dishwasher has added advantages, such as, the completely safe washing of expensive crystal or plastic dishes. It moreover presents the optimum in space relation, since the disposal is immediately adjacent the dishwasher for easy disposal of scraps. It moreover has waist-high loading, eliminating stooping requirements normally involved.

A further object of this invention is to provide a multiple appliance, integrated clothes washer, dishwasher, disposal, and double sink assembly that is readily adaptable for mobile homes and small apartments as well as regular size homes. It results in large saving of space, money savings, less maintenance, and greater convenience.

Another object of this invention is to provide a multiple-appliance apparatus under a double sink unit, having a unique water circulatory mechanism correlated with the sink bottom drain for effective dishwashing employing the sink as a washing chamber.

Further, the chamber can be converted easily into a clothes washer chamber by the unique insertion of a special agitator above a dishwasher water circulator.

Still another object of this invention is to provide a multiple-appliance assembly utilizing a disposal motor as a common source of power to each of the units in an integrated assembly. It moreover optionally has a wet vacuum sweeping unit forming part of the integrated system, to enable a hose attachment to be made for wet or dry vacuum sweeping of wet or dry areas. The swept up materials are washed directly down the drain for optimum efficiency and neatness. It uses no vacuum bags. Moreover, the garbage disposal can be used as simultaneously with use of the dishwasher or clothes washer, and simultaneously with use of the vacuum sweeper. Yet, all of these are powered from a common motor in a simple effective manner.

These and several other objects of this invention will become apparent upon studying the following specification in conjunction with the drawings in which.

*First form of the invention*

Referring now specifically to FIGS. 1 thru 6, the complete assembly 10 is shown embodied in a sink cabinet 12 containing a first sink 14, a second sink 16 and apparatus 18 under the sink enclosed behind doors 20. It will be realized that this particular cabinet is only illustrative, since the particular enclosing structure employed in any given surroundings will vary depending upon whether the unit is built into a counter assembly, or alternatively forms a separate cabinet structure as shown.

The first sink 14 is preferably a standard, shallow sink, about 7½" deep for example. The second sink 16 is a deep well sink, preferably around 14" deep. Obviously, the dimensions can be varied somewhat, provided the sinks are capable of serving as chambers for the functions to be described hereinafter.

Figures 1, 6:
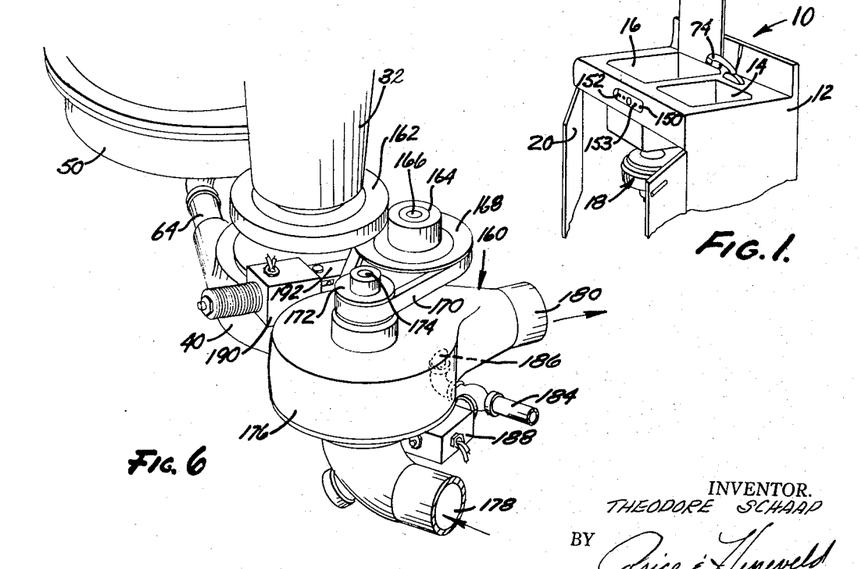
FIG. 1 is a fragmentary perspective view of the complete novel, installed assembly.
FIG. 6 is a perspective, fragmentary view of the apparatus in FIGS. 1 thru 5, shown with a vacuum attachment forming part of the integrated combination.
Figure 2:
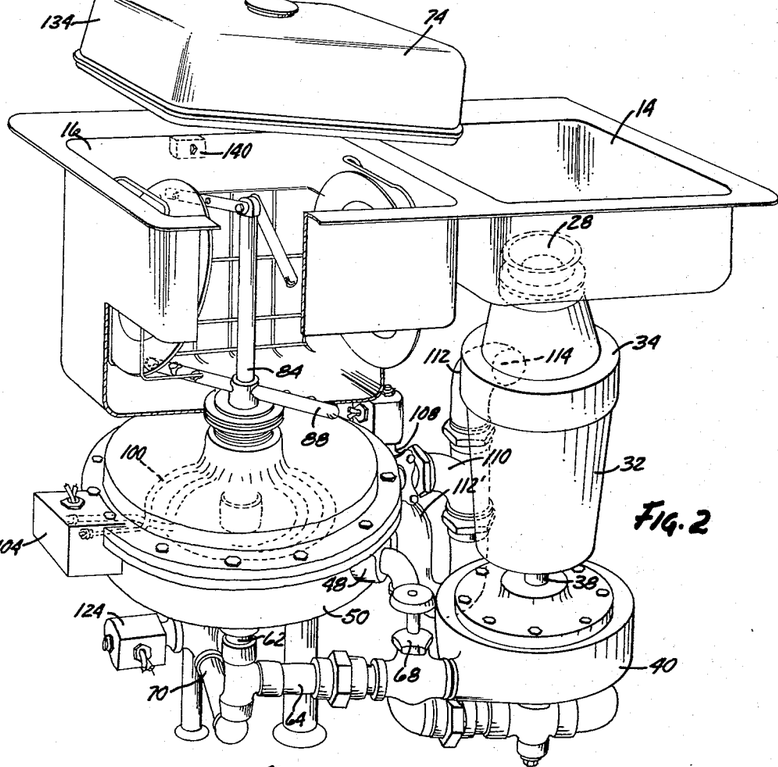
FIG. 2 is an enlarged, perspective view of the operative components of the apparatus in FIG. 1.
Figure 3:
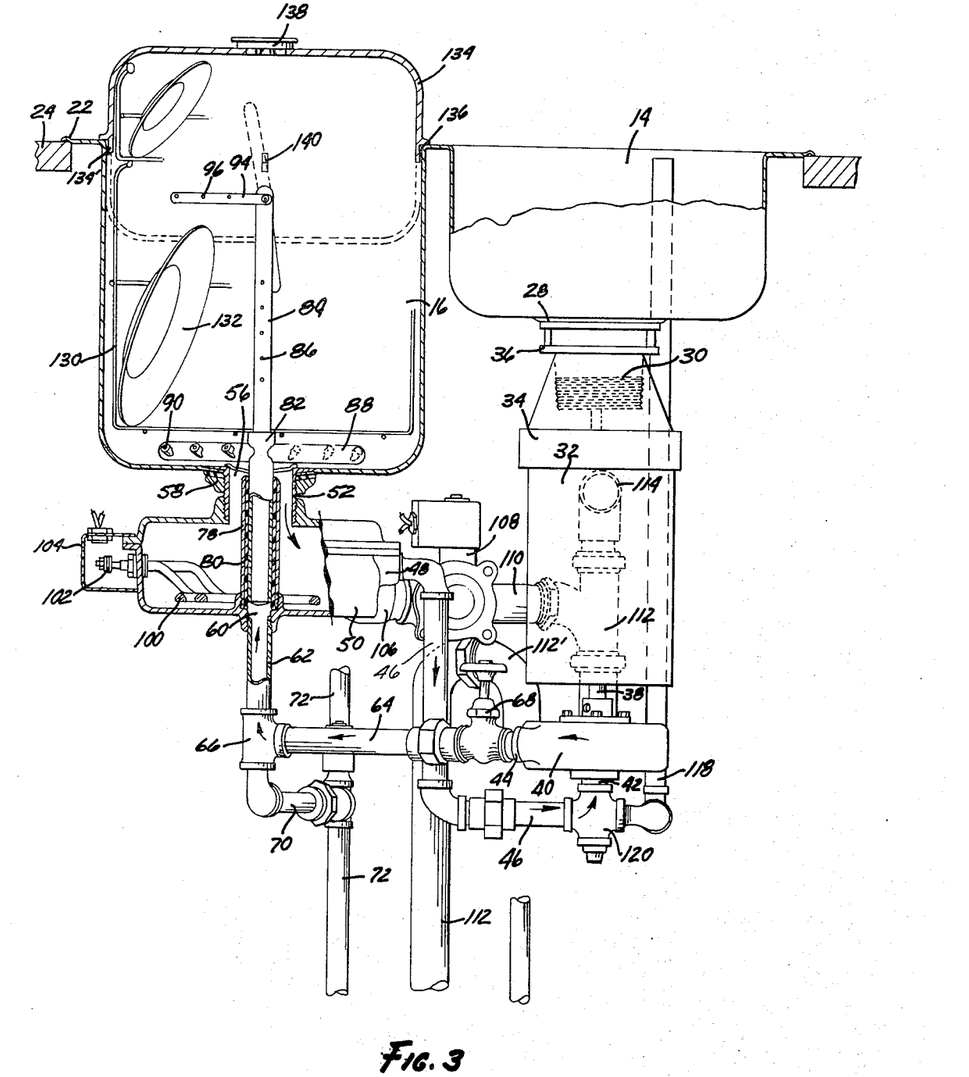
FIG. 3 is a front elevational view of the apparatus of FIG. 2.

The sinks employ a standard peripheral rim construction 22 to form a seal with the counter top 24 (FIG. 3).

Mounted beneath the bottom drain outlet 28 of sink 14 is a garbage disposal unit. It includes conventional revolving garbage grinder disks 30 or the equivalent 30. An electrical motor 32 is drivingly connected to and powers the disks. Motor 32 is purposely of substantially more horse-power than that usually required for the normal garbage disposal due to its multiple function in the integrated system, as explained hereinafter.

The motor is attached to the grinder portion of the garbage disposal by a collar connection 34. The disposal is mounted to the bottom of the sink by bracket 36. Extending from the lower end of motor 32 is an extended auxiliary power shaft 38. Mounted on this power shaft, to be rotatably driven thereby, is a centrifical pump 40 having an internal impeller, a central bottom inlet 42, and a peripheral outlet 44 in conventional fashion.

Communicating with pump inlet 42 is a pipe conduit 46 extending from an outlet 48 of an enlarged water chamber or vessel 50 mounted beneath and to the outlet of the second sink 16. An air vent pipe 118 extends from the cross 120 connecting pipe 46 to pump inlet 42. This water vessel can take several different forms, and is shown to be an enlarged cylindrical member formed of top and bottom half shells bolted together. The top half is threadably attached to a collar 52. The collar has a radially extending peripheral flange positioned above and supported on a radially inwardly extending peripheral flange of sink 16 around its outlet 56. A lock nut 58 retains this assembly.

Figure 4:
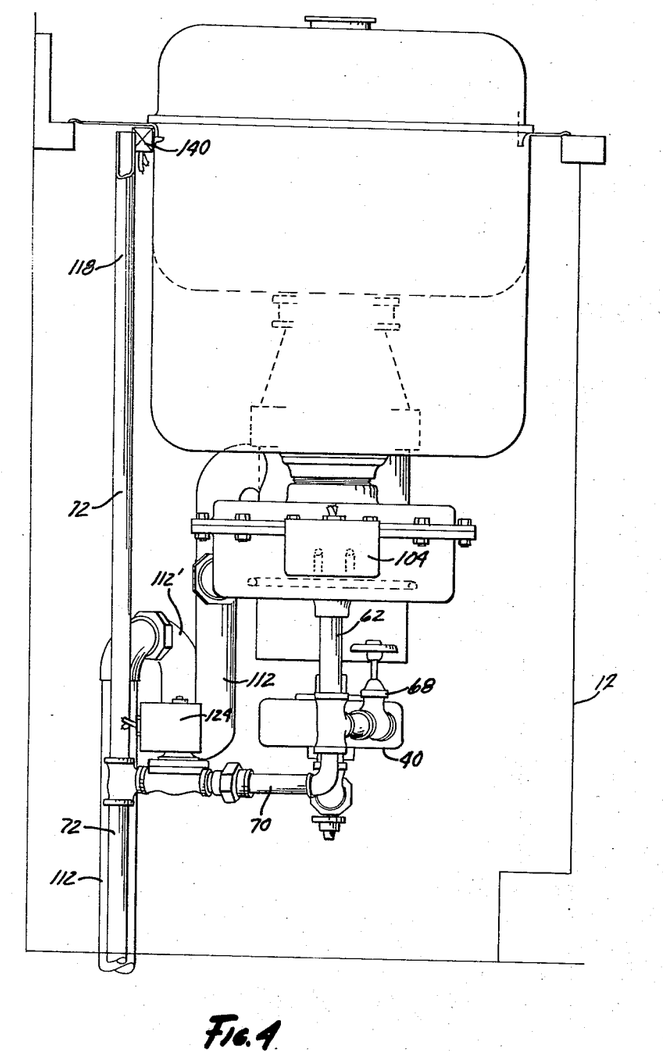
FIG. 4 is a side elevational view of the apparatus in FIG. 2.
Figure 5:
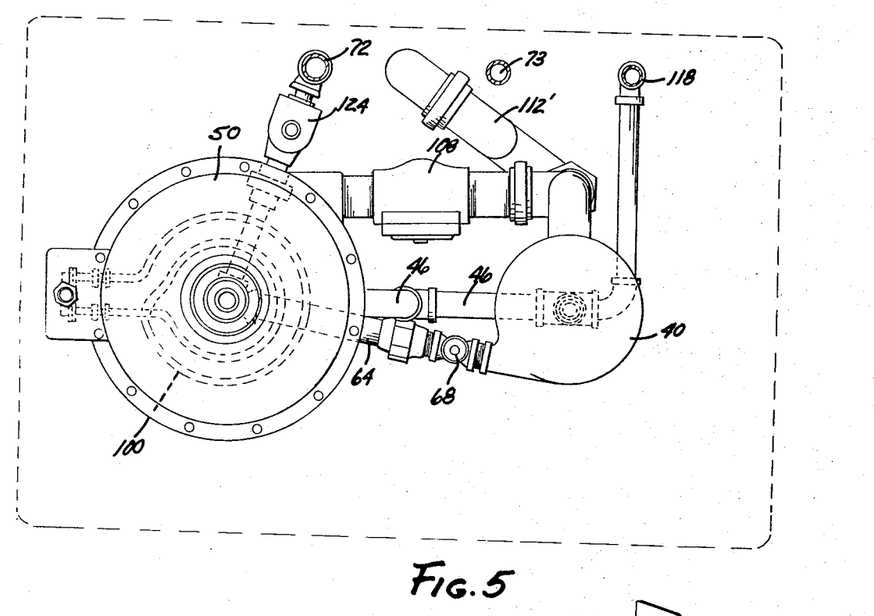
FIG. 5 is a plan view of the apparatus in FIGS. 1 thru 4.

A water inlet port 60 is integrally formed in the center of vessel 50, extending through the bottom thereof. An inlet pipe 62 is connected to this port. The pump outlet 44 is connected to this pipe 62 through a conduit pipe 64 and a conventional T 66. A throttling valve 68 is mounted in pipe 64 to control the outlet flow from pump 40 to pipe 62. Also connected to T 66 and pipe 62 is a conduit 70 from the hot water supply line 72. It includes a hot water flow control solenoid valve 124 (FIG. 4). This hot water supply line 72 also supplies the conventional faucet 74 above the sinks, as does cold water supply line 73 (FIG. 5).

Threadably connected to the integral collar in the bottom of vessel 50 and extending upwardly therefrom through the center of the water vessel and into the neck of threaded collar 52 is an annular sleeve 78. It supports an inner annular bearing 80, as of a plastic material such as nylon or Teflon. Slidably fitted within this bearing is a hollow tube 82 of a standpipe 84 which, when inserted as shown in FIG. 3, extends into sink 16 and up most of its height. This standpipe has outlet orifices 86 along its height. It also includes horizontally extending transverse pipes 88 at the base with metered jets 90 oriented therefrom so that, when water is pumped through the jets, the standpipe is rotated or revolved in its bearing support. Preferably, the upper end of the pipe also includes a pair of pivotally mounted spray tubes 94 which, when the unit is inactive, lie alongside the pipe, but which when the unit is rotated, swing outwardly under centrifugal force. These include spray outlet jets 96. This revolving standpipe is removable from the bearing sleeve. It is normally retained within the sleeve by the weight of the standpipe assembly. Due to its hollow configuration, it is adapted to receive water from pump 42, pipe 64, T 66, pipe 62, and tube 82.

Positioned around sleeve 78 in vessel 50 is an annular electrical heater element 100 having connections 102 outside the vessel in a suitable terminal box 104. In addition to outlet 48, the vessel includes another bottom outlet 106 containing a solenoid operated valve 108 to control flow through this outlet. The valve leads to a pipe 110 which interconnects with the common drain pipe 112. The drain pipe also is in communication with the garbage disposal unit through port 114. Hence this same drain pipe accommodates the entire system. The drain pipe includes a conventional trap 112' (FIG. 4).

Positioned in sink 16 around the standpipe is a removable wire basket 130 to support dishes 132 when the unit is operating as a dishwasher. The sink is covered by an upstanding cover 134 having an annular seal 136 to the sink top. A splash-proof vent 138 is on top of the cover. A cutoff switch in electrical series with the power leads 31 and 31' (FIG. 13) from a typical AC source to motor 32, is mounted to the sink adjacent its top so that downwardly extending flange 134' of the cover contacts this switch to close it when the cover is in position. This enables the unit to be operated when the cover is on, but prevents the unit from being operated without the cover, except that the garbage disposal can preferably be actuated from a separate control switch 150 (FIGS. 1 and 13), which bypasses this cutoff switch due to an electrical parallel connection around it.

The combination unit is therefore capable of operation as a garbage disposal, as a conventional double sink, and as a dishwasher unit. Further, all components are operatively powered from the same disposal motor 32.

More specifically, sink 14 can be used as a disposal by inserting garbage through outlet 28 into grinder 30, and actuating switch 150 to operate the disposal motor 32 (FIG. 13) by connecting it across power leads 31 and 31'.

Figure 13:
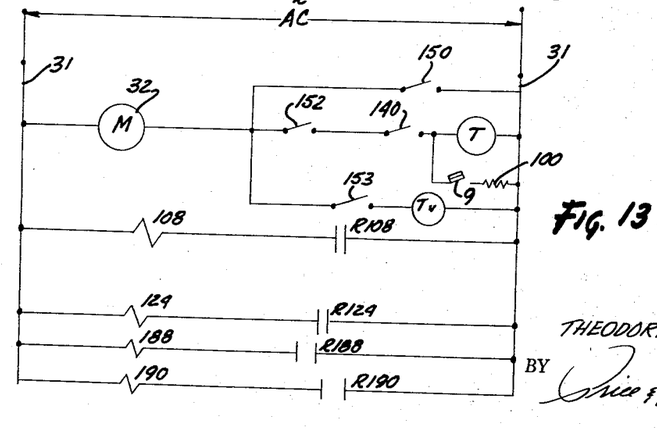
FIG. 13 is a partial circuit diagram of the control system for the first form of the invention.

Alternatively, or simultaneously, standpipe 84 can be slidably inserted as an attachment down into bearing sleeve 80. Then, with throttle valve 68 properly adjusted for optimum circulatory flow control, dishes 132 are placed in wire basket 30, the basket is inserted into sink 16, cover 134 is placed over the sink to close cutoff switch 140, and switch 152 (FIG. 1) is thrown (closed) to actuate motor 32 as controlled by timer T (FIG. 13). First, hot water solenoid valve 124 is operated e.g., by closing relay contacts R124 by relay controlling timer T in conventional fashion, to actuate solenoid 124 electrically and open the hot water valve. This allows hot water from pipe 72 to fill the sink to the desired level. The valve is allowed to close after a predetermined time interval to control the quantity of water introduced into the sink. The actuation of this switch also initiates the operation of motor 32 to drive pump 40, thereby recirculating the water through the system. The recirculation occurs by pumping of water through pipe 64, T 66, pipe 62, opening 60, standpipe tube 82, standpipe 84, out ports 86 and jets 90 and 96 to revolve the standpipe, and spray water on the dishes. The water then flows down annular outlet 56, around sleeve 78, through chamber 50, where it is reheated by unit 100, out port 48, through pipe 46, through cross 120, and back into pump 40 for recirculation again. The water is constantly recirculated, and maintained at a predetermined temperature. The heater 100 is controlled by a temperature responsive switch 9 (FIG. 13) in the system. The heating unit is out of contact with the dishes since it is not in the chamber containing the dishes. Therefore, they are not exposed to localized extra high temperatures which could damage expensive crystal or plastic dishes. When the washing portion of the cycle is complete, waste solenoid valve 108 is opened by timer T actuating relay contacts R108 to actuate solenoid 108 for opening the drain valve. This allows the dirty water to be pumped out pipe 110 through drain line 112, after which the waste valve is closed again. After the water is all drained away, air is circulated through the system by the pump. It is heated by heating coil 100 to dry the dishes. Extra air is supplied through pipe 118.

As would be observed, even while the dishwashing unit is in operation, the garbage disposal unit can be employed for its regular purpose, since its exit through port 114 and out drain line 112 will not effect the dishwashing water or air circuit.

Upon completion of the dishwashing cycle, cover 134 can be removed so that standpipe 84 can be slid out of position and placed in any suitable storage location, such as under the sink. Also, cover 134 can be employed as a vegetable drain by inserting it into sink 16 in an inverted position as illustrated in phantom lines at 134" (FIG. 3).

In addition to these components, a vacuum attachment assembly 160 (FIG. 6) can be integrated into the apparatus. A friction pulley 162 is attached to the extended drive shaft 38 of motor 32 above pump 40, as illustrated. Adjacent this friction pulley is a second driven friction pulley 164 normally out of engagement with drive pulley 162. This driven pulley is on a shaft 166 which also has a belt pulley 168 thereon. A belt 170 passes around this pulley 168 and a second belt pulley 172 on shaft 174 common to vacuum pump 176. The vacuum pump includes a central inlet 178 for air intake and an exhaust outlet 180 connected to the drain line. A water washing inlet pipe 184 has an outlet jet 186 directed downstream into pipe 180. This allows dirt to be washed out of the line. A solenoid valve 188 is provided for controlling the inlet of water through pipe 184. Another solenoid 190 controls a linkage clutch 192 for shifting driven friction pulley 164 into engagement with drive pulley 162. To operate the vacuum attachment, switch 153 is closed (FIGS. 1 and 13) which actuates motor 32 and relay control timer T$v$. This operates relay contacts R190 to actuate solenoid clutch 190, and on a timed basis, operates relay contacts 188 to spray clean the tube. Upon actuation of solenoid 190, pulley 162 driven from motor 32 operates pulley 164, pulley 168, belt 170, pulley 172, shaft 174 and pump 176 to allow vacuum cleaning of the area. In fact, since the unit is capable of handling wet suds, soap, water, etc. and venting it down the drain line, the floor can be wet washed and vacuumed dry, a substantial cleaning advantage. No bags or the like are employed.

*Second form of the invention*

Figures 7, 8, 9:
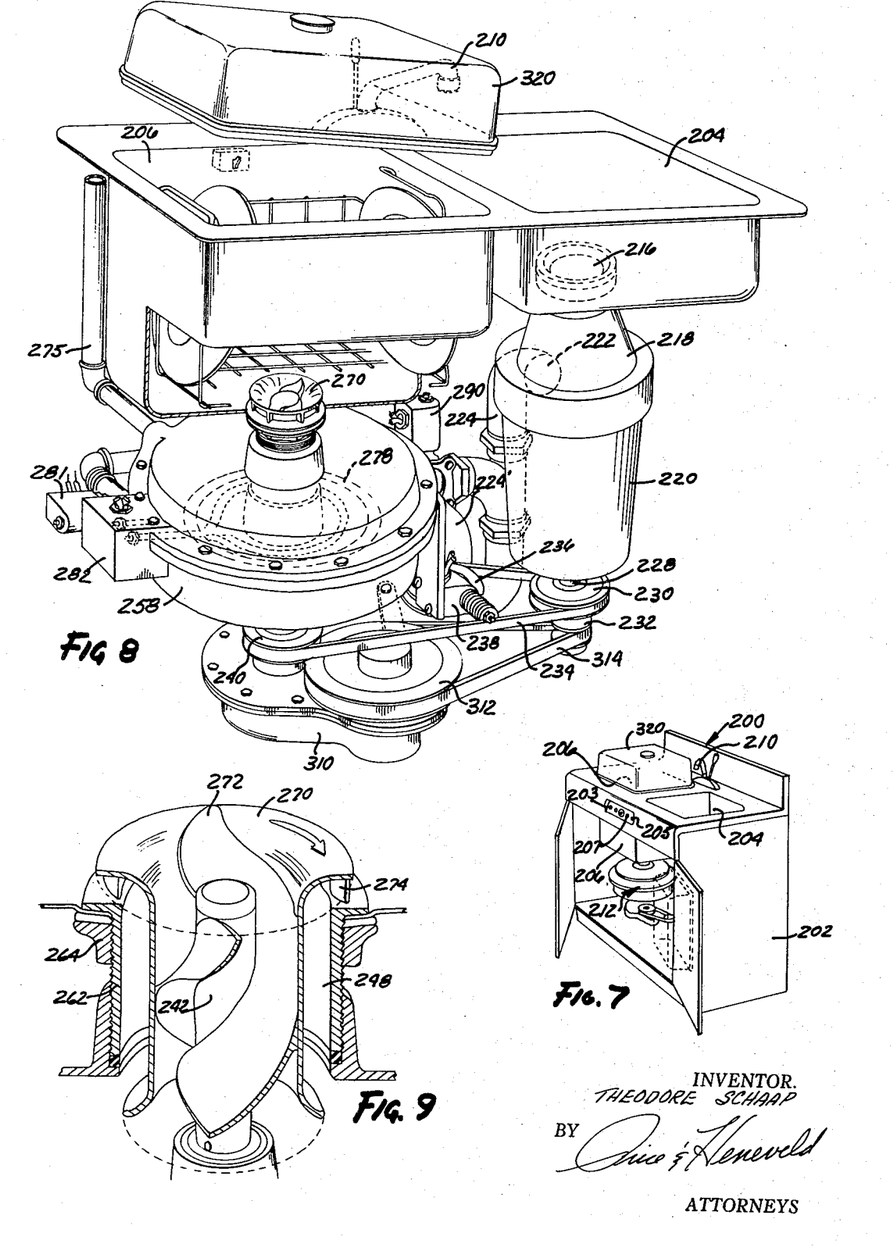
FIG. 7 is a perspective view of a second form of the novel apparatus.
FIG. 8 is an enlarged, perspective view of the operative components of the combination in FIG. 7.
FIG. 9 is an enlarged, cutaway, perspective view of the novel water recirculator forming part of the combination in FIG. 8.
Figure 10:
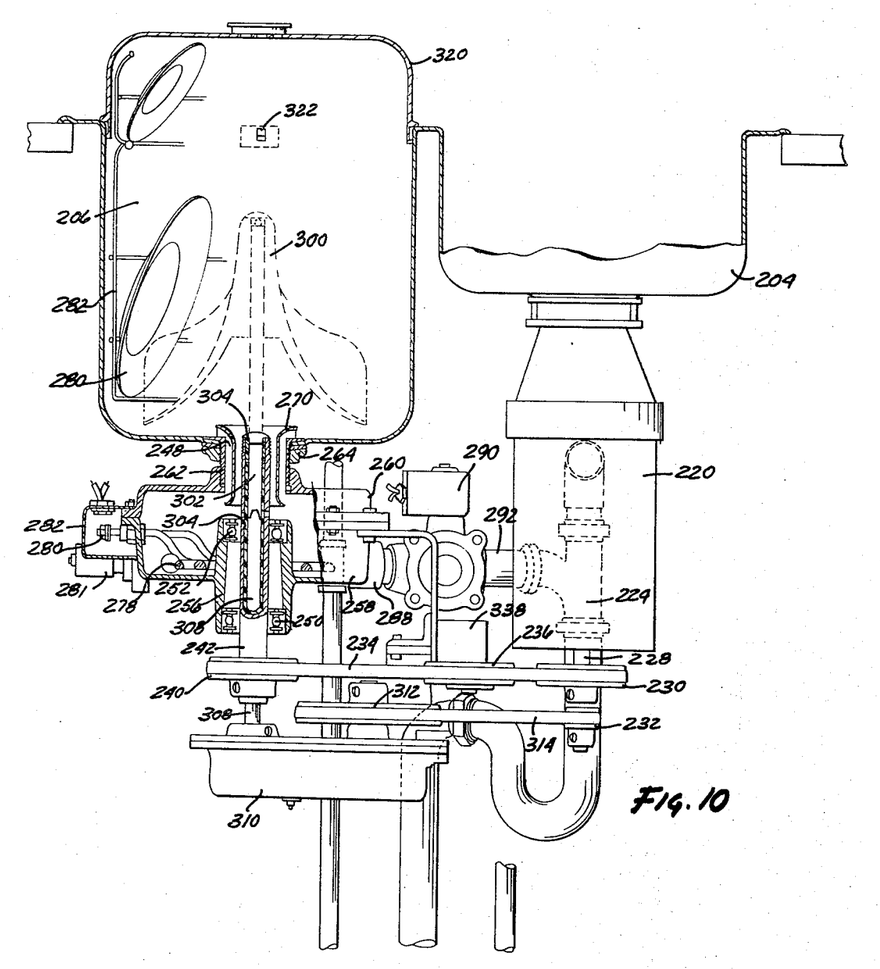
FIG. 10 is a fornt elevational view of the apparatus in FIG. 8.
Figure 11:
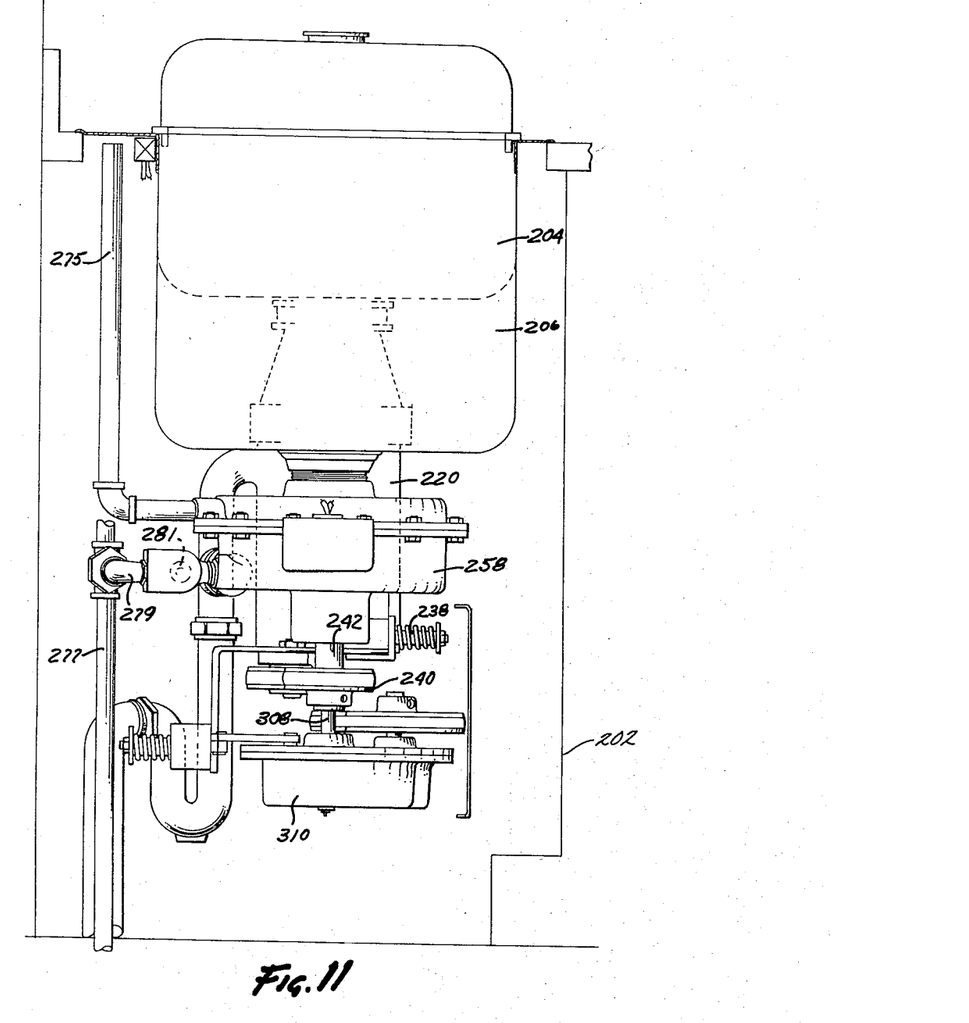
FIG. 11 is an end elevational view of the apparatus in FIGS. 8 thru 10.
Figure 12:
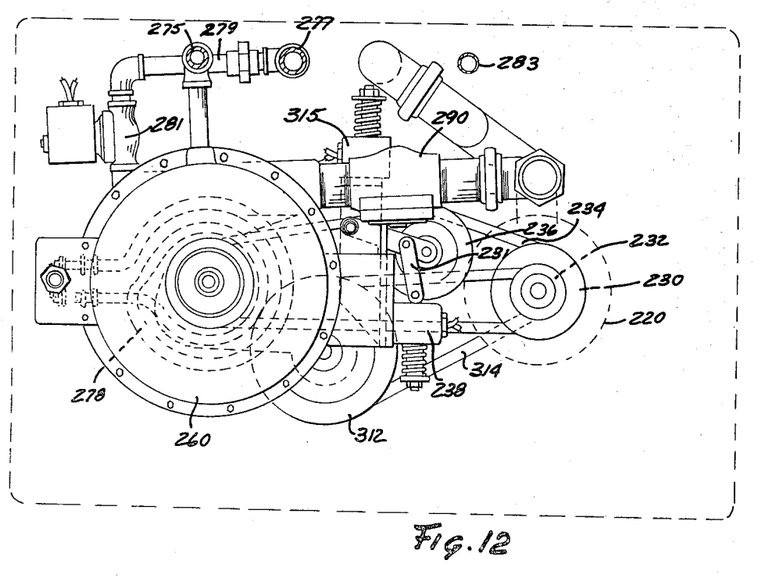
FIG. 12 is a plan view of the apparatus in FIGS. 8 thru 11.

Referring now specifically to FIGS. 7 thru 12, the second form of the invention is illustrated at 200 in FIG. 7, as embodied in a sink cabinet 202 as previously. It incorporates a pair of sinks, first sink 204 and second sink 206, here shown with cover 320 thereon. The sinks, as previously, include a faucet 210 and a special integrated assembly 212 beneath the sinks. This assembly is illustrated more specifically in FIG. 8.

As previously, sink 204 includes an outlet 216 beneath which a garbage disposing unit including a grinder 218 is mounted. A motor 220 is suspended beneath the grinder. The grinder has an outlet port 222 into drain line 224, with a trap 224'. Motor 220 has an extended auxiliary drive shaft 228 out the bottom, which mounts a belt pulley 230 and a second belt pulley 232. The first belt pulley 230 has a drive belt 234 that encompasses a shiftable belt pulley 236 operated by a solenoid 238 through a linkage 231 (FIG. 12), and a third pulley 240 mounted on hollow drive sleeve 242 (see FIG. 10) in alignment with outlet port 248 of sink 206.

This drive sleeve 242 extends up through a pair of bearing assemblies 250 and 252 mounted in bearing housing 256 integral with the bottom half of water chamber 258. This bottom half is bolted by bolts 260 to the top half of the chamber, which in turn is threadably attached to threaded collar 262. The collar is suspended from a peripheral rim of outlet 248 of sink 206. A lock nut 264 holds the assembly in place.

The drive sleeve 242 extends upwardly to a position adjacent the bottom of the sink, and mounts a rotational impeller 270 positioned in the outlet throat of the sink bottom. It protrudes slightly into the sink and protrudes downwardly into vessel 258.

This impeller has a special construction. It includes an annular elongated element with inner blades and outer blades. Referring specifically to FIG. 9, the curved inner blades 272 are helical in configuration, so that, when the impeller is rotated as indicated by the arrow in FIG. 9, it will pump water upwardly through its center into the sink from vessel 258. A second plurality of blades 274 is mounted integral to the outside of the impeller. These are oriented in the opposite direction, so that, with rotation of the impeller, these blades pump water from the sink around annular opening 248 down into chamber 258. Therefore water consantly is pumped into the sink and back out again by the same impeller.

In this chamber is an electrical heater element 278 which includes external terminals 280 inside terminal box 282. The heater element constantly heats the water which is recirculated between the chamber 258 and sink 206 via the unique impeller 270. Hot water is initially supplied through pipe 277 (which also supplies faucet 210) and branch line 279 controlled by solenoid valve 281. A cold water pipe 283 also supplies faucet 210.

This impeller is advantageous for washing dishes 280 in a wire basket 282 for example, by recirculating the water constantly over the dishes while maintaining the water heated.

A waste outlet 288 is provided on water vessel 258, controlled by waste solenoid valve 290. Outlet pipe 292 from the valve enters drain pipe 224. When the water is drained, impeller 270 circulates air supplied through vertical standpipe 275 (FIGS. 8 and 11) over the heater and the dishes to dry them.

The impeller can be inactivated by shifting solenoid 238 to slacken belt 234. This is normally done when the unit is employed for washing clothes, for example a further function of this second form of the invention. More specifically, if it is desired to wash clothes, a special agitator 300 having a downwardly extending connection shaft 302 is inserted in sink 206 so that the shaft extends down through the center of impeller 270, inside sleeve 242, and specifically within a plastic bearing 304 inside this sleeve. The slotted lower end of shaft 302 drivingly engages with the tongue on the upper end of drive shaft 308 extending upwardly from transmission 310 through hollow shaft 242. Shaft 308 is rotatable within sleeve 242.

Transmission 310 is driven through a pulley 312 and a belt 314 from pulley 232. The pulley 312 is shifted to tighten belt 314, by actuation of a spring return solenoid 315 that shifts transmission 310 pivotally a small amount on shaft 308. This solenoid is actuated alternatively with solenoid 238 depending upon whether clothes or dishes are to be washed in sink 216. When agitator 300 is dropped down into engagement with drive shaft 308, the agitator is driven in reciprocal rotary fashion through the conventional washing machine transmission 310 containing a suitable crank and gear linkage. During this clothes washing operation, impeller 270 is retained in an inactive condition due to the belt drive release.

When using either the dishwashing or clothes washing mechanism, cover 320 is sealingly placed over sink 206 to close the washing chamber. It actuates a safety cut-off switch 322 as previously. Suitable timer means is employed in the control circuit to cause water entry, impeller operation for water recirculation, water draining, and impeller operation for air circulation, to wash and dry dishes when the switch 203 (FIG. 7) is thrown. Also, timer means is employed to control water entry, agitator operation, and water drainage for clothes washing when switch 205 is thrown.

Figure 14:
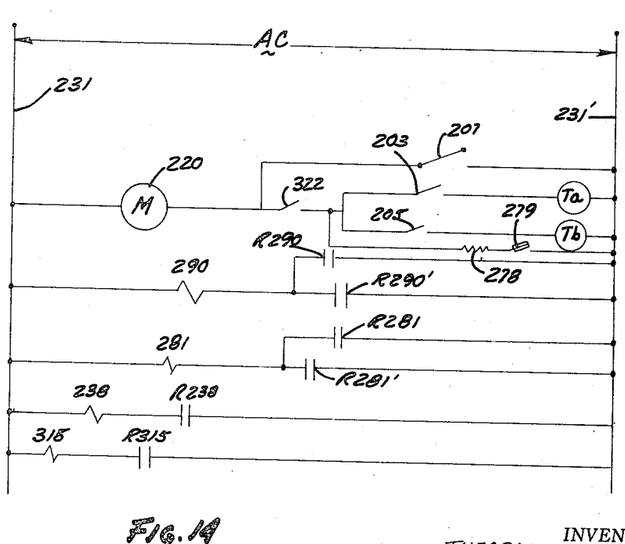
FIG. 14 is a partial circuit diagram of the control system for the second form of the invention.

More specifically, referring to FIG. 14, the garbage disposal can be operated by merely closing switch 207 to complete the circuit from leads 231 and 231' across motor 220. Or switch 203 can be closed to wash dishes, so that when switch 322 is closed by the cover, relay controlling timer T$a$ is actuated to closed, on a timed basis, relay contacts R281 to operate hot water solenoid valve 281, contacts R238 to operate clutch 238 and R290 to operate waste solenoid valve 290. Alternatively, by closing switch 205 for washing clothes, relay controlling timer T$b$ is actuated to operate contacts R281' and R290' for hot water and waste discharge, and R315 for the clutch solenoid 315. In either case heater 278 is controllably operated through temperature responsive switch 279.

Thus, with this same compact assembly, which is relatively simple in structure, and is powered with one simple motor, even though it is located in a hidden condition under the sink, the sink double unit can be employed (1)

in a conventional way, (2) as a garbage disposal, (3) as a dishwasher, or (4) as a clothes washer unit. Furthermore the garbage disposal unit can be used simultaneously with washing dishes or washing clothes. Sink 204 can be used for its regular purposes when washing dishes or washing clothes in sink 206.

Hence, the system is an integrated, multiple-appliance apparatus, retained under a double sink in unique fashion with components operatively associated with each other and yet separately usable for individual functions. Consequently, space saving is large, cost savings are substantial, maintenance is relatively simply performed on the minimum of components, each selected operation is effectively controlled and efficient, plumbing connections are at a minimum, electrical wiring and control assemblies are few. In addition to these advantages, others will undoubtedly occur to those in the art upon studying the aforesaid forms of the invention. Also, various minor changes in the plumbing set-up, motor drive arrangement, vessel configuration, sink depths, cover structure, switching arrangements, etc. will undoubtedly occur to those in the art within the concept of this invention, to suit a particular apartment project, mobile home construction, housing sink structure or the like. Consequently, this invention is to be limited only by the scope of the appended claims, and the reasonable equivalents thereto, in view of this relatively basic advance.

I claim:

1. An integral, double sink, integrated multiple-appliance assembly, comprising: first and second adjacent sinks, each having a bottom outlet; a disposal beneath one of said outlets, having a drive motor with an auxiliary extended power shaft, and having a drain line; a recirculating pump operably connected to said power shaft; recirculation flow conduit means from the other outlet to said pump, and from said pump back through said other outlet into the respective sink for circulation of water therethrough; a drain conduit from said flow conduit means to said drain line; a solenoid control valve on said drain conduit; a hot water inlet conduit into said flow conduit means; a solenoid control valve on said hot water conduit; and heater means in said recirculatory flow conduit means, whereby hot water introduced thereinto may be constantly reheated while recirculated through said respective sink by said drive motor and recirculatory pump for washing articles in said respective sink, and then can be drained out the disposal drain line.

2. The appliance assembly in claim 1 wherein said conduit means includes an enlarged water chamber and said heater means comprises an electric heater in said water chamber.

3. An integral, double sink, multiple-appliance assembly, comprising: first and second adjacent sinks, each having a bottom outlet; a disposal beneath one of said outlets, having a drive motor with an auxiliary, extended power shaft, and having a drain line; a recirculating pump operably connected to said power shaft; recirculation flow conduit means from the other outlet to said pump, and from said pump back through said other outlet into the respective sink for circulation of water therethrough; said other outlet including a receiving bearing socket; a removable revolvable standpipe in said respective sink, slidably fitted in said socket, and having lateral extensions with a plurality of outlet jets oriented to rotate said standpipe when water is discharged therefrom; a drain conduit from said flow conduit means to said drain line; a solenoid control valve on said drain conduit; a hot water inlet conduit into said flow conduit means; a solenoid control valve on said hot water conduit; and heater means in said recirculatory flow conduit means, whereby hot water introduced thereinto may be constantly heated while recirculated through said respective sink by said drive motor and recirculatory pump.

4. A kitchen appliance apparatus comprising: a pair of first and second sink chambers, each having bottom outlets; a disposal appliance in communication with the outlet on said first sink; a water circulating washer appliance in communication with the outlet on the said second sink; and a power motor operably connected to both said disposal appliance and washer appliance; electrical power supply means operably connected to said power motor, including a normally open safety switch means adjacent the top of said second sink to prevent actuation of said washer appliance; and sealing cover means receivable by said second sink, and operably engageable with said safety switch when received by said second sink, to close said safety switch and thereby control actuation of said washer appliance.

5. An integral double sink, multiple-appliance assembly, comprising: first and second adjacent sinks, each having a bottom outlet; a disposal beneath one of said outlets, having a drive motor with an auxiliary, extended power shaft and having a drain line; a recirculating pump operably connected to said power shaft; recirculation flow conduit means from the other outlet to said pump, and from said pump back through said other outlet into the respective sink for circulation of water therethrough to form a washer appliance; said other outlet including a receiving bearing socket; a removable, revolvable standpipe slidably fitted in said socket and having lateral extensions with a plurality of outlet jets oriented to rotate said standpipe; a drain conduit from said flow conduit means to said drain line; a solenoid control valve on said drain conduit; a hot water inlet conduit into said flow conduit means; a solenoid control valve on said hot water conduit; heater means in said recirculatory flow conduit means whereby hot water introduced thereinto may be constantly heated while recirculated through said respective sink by said drive motor and recirculatory pump; an electrical power circuit operably connected to said power motor, and including a safety switch adjacent the top of said second sink; and sealing cover means for said second sink, operably engageable with said safety switch when placed on said second sink to control actuation of said washer appliance.

6. A kitchen appliance apparatus comprising: a pair of first and second sink chambers having first and second respective bottom outlets; a disposal appliance in communication with said first outlet; a water circulating washer appliance in communication with said second outlet; said washer appliance including a vessel beneath and in receiving communication with said second outlet, and including a water circulating impeller means in receiving communication with said vessel; said impeller means having an outlet directed into said second chamber through said second outlet; hot water supply means into said washer appliance, and power motor means operably connected to said disposal appliance and said impeller means of said washer appliance; drain line means from said sinks, disposal, and vessel; a high speed evacuating impeller assembly adjacent said disposal; a releaseable-engageable drive connection between said impeller assembly and said motor means, including clutch means; an exhaust outlet from said impeller assembly to said drain line means; and a suction inlet hose connector means to said impeller assembly for attachment of a vacuum cleaner hose thereto.

7. A kitchen appliance apparatus comprising: a pair of first and second sink chambers having first and second respective bottom outlets; a disposal appliance in communication with said first outlet; power motor means operably connected to said disposal; a high speed evacuating impeller assembly adjacent said disposal; a releasable-engageable drive connection between said impeller assembly and said motor means, including clutch means; an exhaust outlet from said impeller assembly to said drain line means; and a suction inlet hose connector means to said impeller assembly for attachment of a vacuum cleaner hose thereto.

8. An integrated multiple-appliance apparatus for a kitchen comprising: a general purpose sink and a dishwasher chamber located in proximity to each other; said sink having at least one bottom outlet; a common drain line means for said sink and dishwasher chamber; a general purpose disposal appliance located underneath said sink means and in communication with and between said outlet and said drain line means so as to receive and dispose of garbage deposited in said sink and passing through said outlet without contaminating said dishwasher chamber; a water injecting washer means including a plurality of spray jets located in said dishwasher chamber and a separate pump means for supplying water under pressure to said spray jets; and a common power motor operably connected by means of a common shaft to both said disposal appliance and pump means.

9. A kitchen appliance apparatus comprising: at least one sink chamber having a bottom outlet; a disposal appliance in communication with said outlet and a drain line means; power motor means operably connected to said disposal; a high speed evacuating impeller assembly adjacent said disposal; a releasable-engageable drive connection between said impeller assembly and said motor means, including clutch means; an exhaust outlet from said impeller assembly to said drain line means; and a suction inlet hose connector means to said impeller assembly for attachment of a vacuum cleaner hose thereto.

10. An integrated multiple-appliance apparatus for a kitchen comprising: a sink and a dishwasher chamber located in proximity to each other; said sink having at least one bottom outlet; a common drain line means for said sink and dishwasher chamber; a disposal appliance located underneath said sink means and in communication with and between said outlet and said drain line means so as to receive and dispose of garbage deposited in said sink and passing through said outlet without contaminating said dishwasher chamber; a water injecting washer means including a plurality of spray jets located in said dishwasher chamber and a separate pump means for supplying water under pressure to said spray jets; a high speed evacuating impeller assembly adjacent said disposal; an exhaust outlet from said impeller assembly to said drain line means; a suction inlet hose connector means to said impeller assembly for attachment of a vacuum cleaner hose thereto; and a common power motor operably connected to said disposal appliance impeller assembly and pump means, said connection between said impeller assembly and said power motor including a clutch means with a releasable-engageable drive connection.

References Cited

UNITED STATES PATENTS

| | | | |
|---|---|---|---|
| 1,485,796 | 3/1924 | Merseles et al. | 134—176 |
| 1,995,331 | 3/1935 | Snyder et al. | 134—58 |
| 2,418,366 | 4/1947 | Powers | 134—115 X |
| 2,754,835 | 7/1956 | Casady | 134—112 |
| 2,802,477 | 8/1957 | Levit | 134—115 X |
| 3,023,757 | 3/1962 | Mixon | 134—176 X |

FOREIGN PATENTS

| | | |
|---|---|---|
| 946,799 | 1/1964 | Great Britain. |
| 527,245 | 7/1956 | Canada. |

WILLIAM I. PRICE, *Primary Examiner.*